United States Patent Office 2,927,826
Patented Mar. 8, 1960

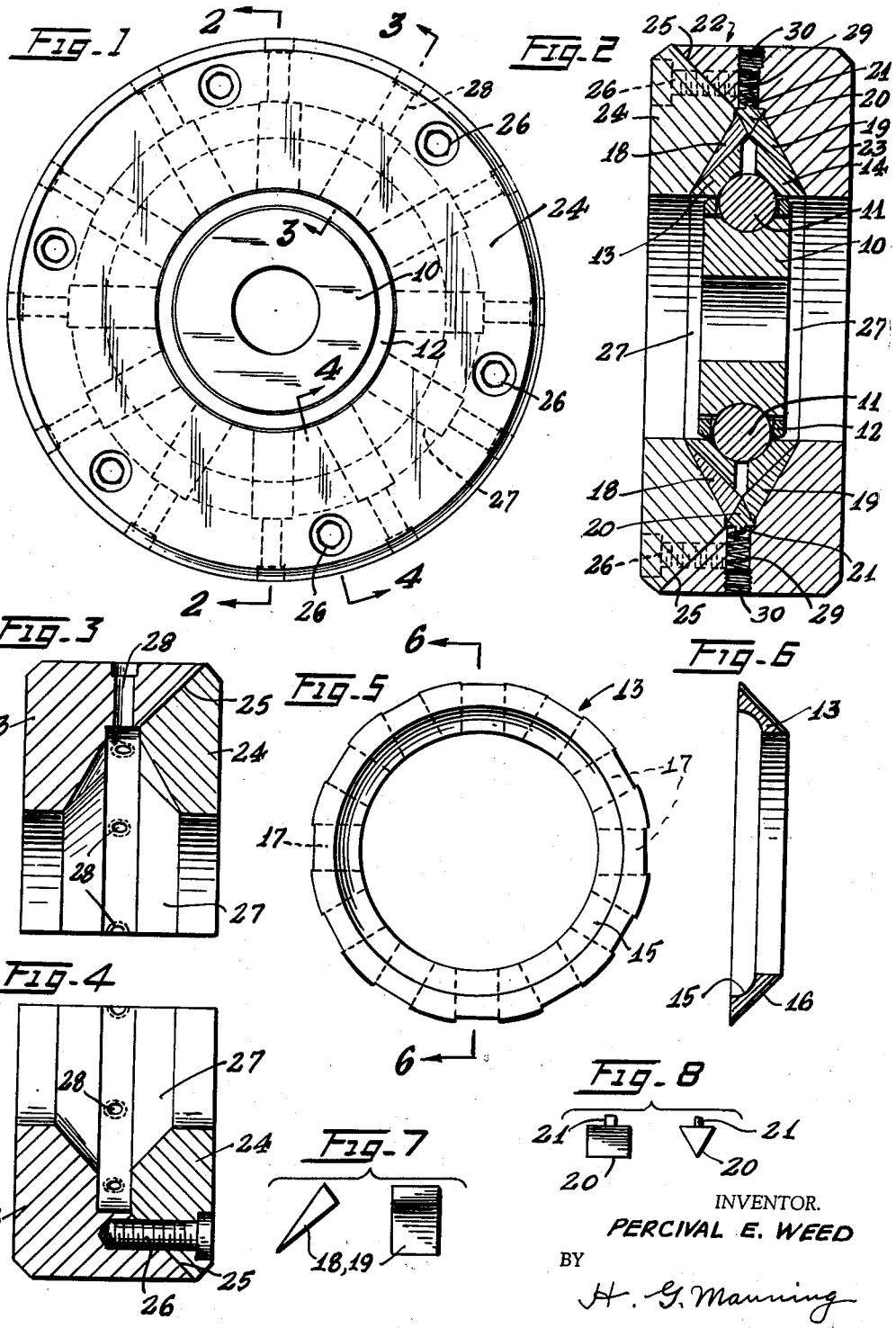

2,927,826

SELF-ADJUSTING BALL BEARING

Percival E. Weed, Newington, Conn.

Application March 26, 1958, Serial No. 724,161

7 Claims. (Cl. 308—197)

My invention relates to ball bearings, and is directed more particularly to a ball bearing device which automatically compensates for the wearing of the balls and raceways.

The principal object of my invention is to provide an improved ball bearing device comprising a self-adjusting mechanism for keeping the bearing and its journalled rotary member tight, concentric, and free from play at all times.

A more particular object of the invention is to provide a ball bearing structure of the character described, wherein the outer casing is transversely split to provide two separate parts, and wherein a plurality of spring-actuated sliding wedges serve to resiliently hold a pair of outer raceway parts in embracing relation with respect to the bearing balls supported on the usual single inner raceway.

Another object is to provide an improved self-adjusting ball bearing structure of the above nature which is simple in construction, inexpensive to manufacture, diversified in use, and extremely long wearing and effective in operation.

Other objects, features and advantages of the invention will be apparent from the following description when read with reference to the accompanying drawings, wherein:

Fig. 1 is a side elevational view of a self-adjusting ball bearing embodying my invention, Fig. 2 is a vertical cross-sectional view, taken along the line 2—2 of Fig. 1, looking in the direction of the arrows, Fig. 3 is a cross-sectional view, taken along the line 3—3 of Fig. 1, looking in the direction of the arrows, Fig. 4 is a cross-sectional view, taken along the line 4—4 of Fig. 1, looking in the direction of the arrows, Fig. 5 is a side elevational view of one of the outer raceway sections, Fig. 6 is a vertical cross-sectional view of the outer raceway section shown in Fig. 5, taken along the line 6—6 thereof, looking in the direction of the arrows, Fig. 7 shows side and front views, respectively, of one of the slip wedges forming part of the ball bearing assembly, and Fig. 8 shows front and side views, respectively, of one of the compression wedges forming part of the ball bearing assembly.

Referring now in detail to the drawings, wherein like reference numerals denote corresponding parts throughout the several views, the self-adjusting ball bearing embodying my invention comprises a circular, single inner raceway 10 of ordinary construction, about the peripheral concave track of which a plurality of balls 11 are supported in spaced relation by an ordinary ball cage 12.

The caged balls 11 are supported from the outside by an outer raceway system comprising a pair of identical opposed circular raceway sections 13, 14 (see Figs. 5, 6), which are each provided with arcuate annular concave grooves 15 for supporting the opposed, spaced, caged balls 11 embraced thereby.

The outside of each raceway section 13, 14, opposite its arcuate groove 15 is bevelled, as indicated at 16 in Fig. 6, and is formed with a plurality of radially-extending, shallow rectangular through slots 17, twelve in this instance. Slidably fitted within the slots 17 of the raceway sections 13, 14 and projecting outwardly therefrom are a plurality of identical sets of rectangular slip wedges 18, 19 respectively (see Figs. 2, 7). The bases of the slip wedges 18 in the raceway section 13 are arranged in register with one each of the slip wedges 19 in the raceway section 14, and provide a plurality of peripheral V-shaped slots, within which a like number of compression wedges 20 of isosceles triangular cross-sectional shape are slidingly disposed. The outer face of each compression wedge 20 is provided with a centrally located radial pin 21 for anchoring the lower ends of a plurality of peripheral coiled compression springs 29, as hereinbelow more fully described.

An annular outer casing 22 is provided for supporting and holding the ball bearing parts in assembled relation, said casing 22 comprising a pair of complemental side members 23, 24, separable along an inclined annular parting surface 25, and held in assembled relation by six sidewardly-extending machine screws 26.

The casing 22 is provided with a plurality of shallow radial slots 27 matching the slots 17 in the outer raceway sections 13, 14, and within which the slip wedges 18, 19 are slidably fitted.

The larger casing side member 23 is provided with a plurality of radially-extending peripheral bores 28, one for each of the radial slots 27, and in axial alignment with one each of the anchoring pins 21 on the compression wedges 20. Fitted in each of the bores 28 is the helical compression spring 29, the lower end of which is anchored on the wedge pin 21, and the upper ends of which are held under compression by set-screws 30, screwed into threaded portions of the upper ends of said bores 29.

*Operation*

In operation, the resilient compressional forces of each of the springs 29 imparted to the wedges 20, tend to push inwardly with equal force on all of the opposed pairs of slip wedges 18, 19, which in turn tend to resiliently press the pair of outer raceway sections 13, 14 toward each other and into tight abutting engagement with each side of the balls 11. It will thus be seen that as wear takes place during use, both side play and end play between the raceways and balls will be automatically eliminated.

While I have described and illustrated herein a preferred embodiment of my invention, it is to be understood that this disclosure is for the purpose of illustration only, and that various changes in arrangement and shape of the parts, as well as the substitution of equivalent elements for those herein shown and described, may be made without departing from the spirit and scope of the invention as set forth in the appended claims.

What I claim as new and desire to secure by Letters Patent is:

1. In a self-adjusting ball bearing, the combination comprising a circular inner raceway having an outer concave ball track, a plurality of bearing balls arranged in spaced relation about the track of said inner raceway, a pair of circular coaxial, spaced opposed outer raceway sections providing a sidewardly-abutting track for the outer ends of said bearing balls, each outer raceway section having a beveled outer side surface, and a plurality of rectangular radial slots arranged in each side surface of said outer raceway, slip wedge members slidably arranged in each of said radial slots, an annular casing surrounding said outer raceway sections and having an interior beveled annular groove, said groove having opposed slots in each side complementary to the slots in said raceway side surfaces and adapted to slidably receive the outer sides of said slip wedge members, and resilient means for urging said slip wedge members inwardly for pressing said raceway sections inwardly towards each other for automatically eliminating looseness and play between said inner balls and the outer raceway sections.

2. A self-adjusting ball bearing as defined in claim 1, wherein said resilient means comprises a plurality of spring pressed compression wedges located between said casing and the outer end portions of said slip wedge members.

3. A self-adjusting ball bearing as defined in claim 1, wherein the opposed pairs of said slip wedge members in both said outer raceway sections have bases defining an isosceles triangle, wherein each of said resilient means comprises a compression wedge member slidably fitted between the bases of said opposed slip wedge members, and includes radially extending helical springs located between said casing and the outer surface of each of said compression wedge members.

4. A self-adjusting ball bearing as defined in claim 1, wherein said casing is comprised of a pair of transversely separable outer side members.

5. A self-adjusting ball bearing as defined in claim 4, wherein the outer peripheral surface of said casing is cylindrical in form, and wherein said plane of separation extends obliquely from the interior to one end of said side members.

6. In a self-adjusting ball bearing, the combination comprising a circular inner raceway having an outer concave track, a plurality of bearing balls arranged in spaced relation about said track, a pair of circular coaxial, spaced, opposed outer raceway sections providing sidewardly-abutting tracks for the outer ends of said bearing balls, an annular casing surrounding said outer raceway sections, and mechanism interconnecting said casing and said outer raceway sections for resiliently urging said outer raceway sections towards each other for eliminating looseness and play between said balls and said inner and outer raceways, said mechanism comprising a plurality of slip wedge members slidably disposed between the side portions of said outer raceway sections and said casing, and spring pressed compression wedge members located between said casing and the end portions of said slip wedge members.

7. In a self-adjusting ball bearing, the combination comprising a circular inner raceway having an outer concave track, a plurality of bearing balls arranged in spaced relation about said track, a pair of circular coaxial, spaced, opposed outer raceway sections providing sidewardly-abutting tracks for the outer ends of said bearing balls, an annular casing surrounding said outer raceway sections, mechanism interconnecting said casing and said outer raceway sections for resiliently urging said outer raceway sections towards each other, for eliminating looseness and play between said balls and said inner and outer raceways, a plurality of slip wedge members slidably disposed between the side portions of said outer raceway and said casing, a plurality of complementary pairs of slots being provided in said casing and said outer raceway sections, for receiving opposite sides of one each of said slip wedge members.

References Cited in the file of this patent

UNITED STATES PATENTS

| | | |
|---|---|---|
| 751,715 | Butler | Feb. 9, 1904 |
| 1,364,675 | Almfelt | Jan. 4, 1921 |
| 1,767,429 | Brittain et al. | June 24, 1930 |
| 2,284,427 | Hufferd et al. | May 26, 1942 |
| 2,302,742 | Crise | Nov. 24, 1942 |